(12) United States Patent
Kirby et al.

(10) Patent No.: US 7,918,383 B2
(45) Date of Patent: Apr. 5, 2011

(54) METHODS FOR PLACING SUBSTRATES IN CONTACT WITH MOLTEN SOLDER

(75) Inventors: Kyle K. Kirby, Boise, ID (US); Salman Akram, Boise, ID (US); Daniel P. Cram, Boise, ID (US); Roy T. Lange, Boise, ID (US); Warren M. Farnworth, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 1107 days.

(21) Appl. No.: 11/140,420

(22) Filed: May 27, 2005

(65) Prior Publication Data

US 2006/0043154 A1 Mar. 2, 2006

Related U.S. Application Data

(60) Provisional application No. 60/606,798, filed on Sep. 1, 2004.

(51) Int. Cl.
*B23K 31/02* (2006.01)
(52) U.S. Cl. .......................................... 228/260; 228/37
(58) Field of Classification Search .................... 228/37, 228/256, 260
See application file for complete search history.

(56) References Cited

U.S. PATENT DOCUMENTS

| | | | |
|---|---|---|---|
| 3,865,298 A | 2/1975 | Allen et al. | |
| 3,874,068 A | 4/1975 | Cook | |
| 4,408,560 A * | 10/1983 | Caratsch | 118/69 |
| 4,410,126 A * | 10/1983 | O'Rourke | 228/180.1 |
| 4,511,076 A | 4/1985 | Roth | |
| 4,530,457 A | 7/1985 | Down | |
| 4,602,730 A * | 7/1986 | Murakami et al. | 228/37 |
| 4,679,720 A * | 7/1987 | Sedrick et al. | 228/20.1 |
| 4,684,056 A * | 8/1987 | Deambrosio | 228/180.1 |
| 4,700,935 A | 10/1987 | Winslow et al. | |
| 4,824,010 A * | 4/1989 | Inoue et al. | 228/180.21 |
| 4,848,644 A | 7/1989 | Cunningham | |

(Continued)

FOREIGN PATENT DOCUMENTS

WO WO 2004/030090 A1 4/2004

OTHER PUBLICATIONS

Goenka et al., Void Formation in Flip Chip Colder Bumbs—Part II, 1996 IEEE/CMPT Int'l Electronics Manufacturing Technology Symposium, pp. 430-437, Dearborn, MI.

(Continued)

*Primary Examiner* — Roy King
*Assistant Examiner* — Michael Aboagye
(74) *Attorney, Agent, or Firm* — TraskBritt

(57) ABSTRACT

Methods and devices for placing a semiconductor wafer or other substrate in contact with solder are described. A wave soldering apparatus includes a solder bath, a nozzle for producing a solder wave, and a jig for orienting a substrate in a substantially vertical orientation and placing the substrate in contact with a cascading solder wave. In another wave soldering apparatus, a jig orients a semiconductor wafer in a substantially horizontal orientation in contact with the solder wave. Another soldering apparatus includes a tank comprising molten solder and a fixture configured to orient one or more semiconductor wafers in a substantially vertical orientation. Methods of placing semiconductor wafers or other substrates in contact with solder using the devices of the present invention are also disclosed.

18 Claims, 9 Drawing Sheets

U.S. PATENT DOCUMENTS

| | | | |
|---|---|---|---|
| 4,982,376 A * | 1/1991 | Megens et al. | 361/760 |
| 5,052,612 A | 10/1991 | Tecle | |
| 5,110,036 A | 5/1992 | Parker, Jr. | |
| 5,111,991 A * | 5/1992 | Clawson et al. | 228/180.1 |
| 5,121,875 A | 6/1992 | Hagerty et al. | |
| 5,176,307 A * | 1/1993 | Hagerty et al. | 228/37 |
| 5,228,614 A * | 7/1993 | Elliott et al. | 228/37 |
| 5,382,547 A | 1/1995 | Sultan et al. | |
| 5,388,752 A * | 2/1995 | Kawakatsu | 228/20.1 |
| 5,520,967 A | 5/1996 | Banks et al. | |
| 5,535,936 A * | 7/1996 | Chong et al. | 228/175 |
| 5,719,749 A | 2/1998 | Stopperan | |
| 5,901,899 A | 5/1999 | Flache | |
| 5,946,589 A | 8/1999 | Ng et al. | |
| 6,030,893 A | 2/2000 | Lo et al. | |
| 6,138,890 A * | 10/2000 | Kanno et al. | 228/37 |
| 6,153,503 A | 11/2000 | Lin et al. | |
| 6,202,916 B1 | 3/2001 | Updike et al. | |
| 6,273,319 B1 | 8/2001 | Ichikawa et al. | |
| 6,372,624 B1 * | 4/2002 | Farnworth et al. | 438/614 |
| 6,427,902 B2 | 8/2002 | Leturmy | |
| 6,462,285 B2 | 10/2002 | Enroth et al. | |
| 6,471,111 B1 * | 10/2002 | Hertz et al. | 228/111.5 |
| 6,528,891 B2 | 3/2003 | Lin | |
| 6,544,871 B1 | 4/2003 | Honeycutt | |
| 6,575,352 B2 | 6/2003 | Takahashi et al. | |
| 6,737,351 B2 | 5/2004 | Ogawa et al. | |
| 7,122,905 B2 | 10/2006 | Grigg | |
| 2001/0040295 A1 | 11/2001 | Tracy et al. | |
| 2005/0230457 A1 | 10/2005 | Kay et al. | |

OTHER PUBLICATIONS

Jacobs et al., Voiding in Ultra Porous Low-k Materials Proposed Mechanism, Detection and Possible Solutions, International Sematech, pp. 236-238, 2002, Austin, TX.

Karl E. Bahr, Through-Hole Soldering, Hollis Automation, Inc. pp. 681-696.

* cited by examiner

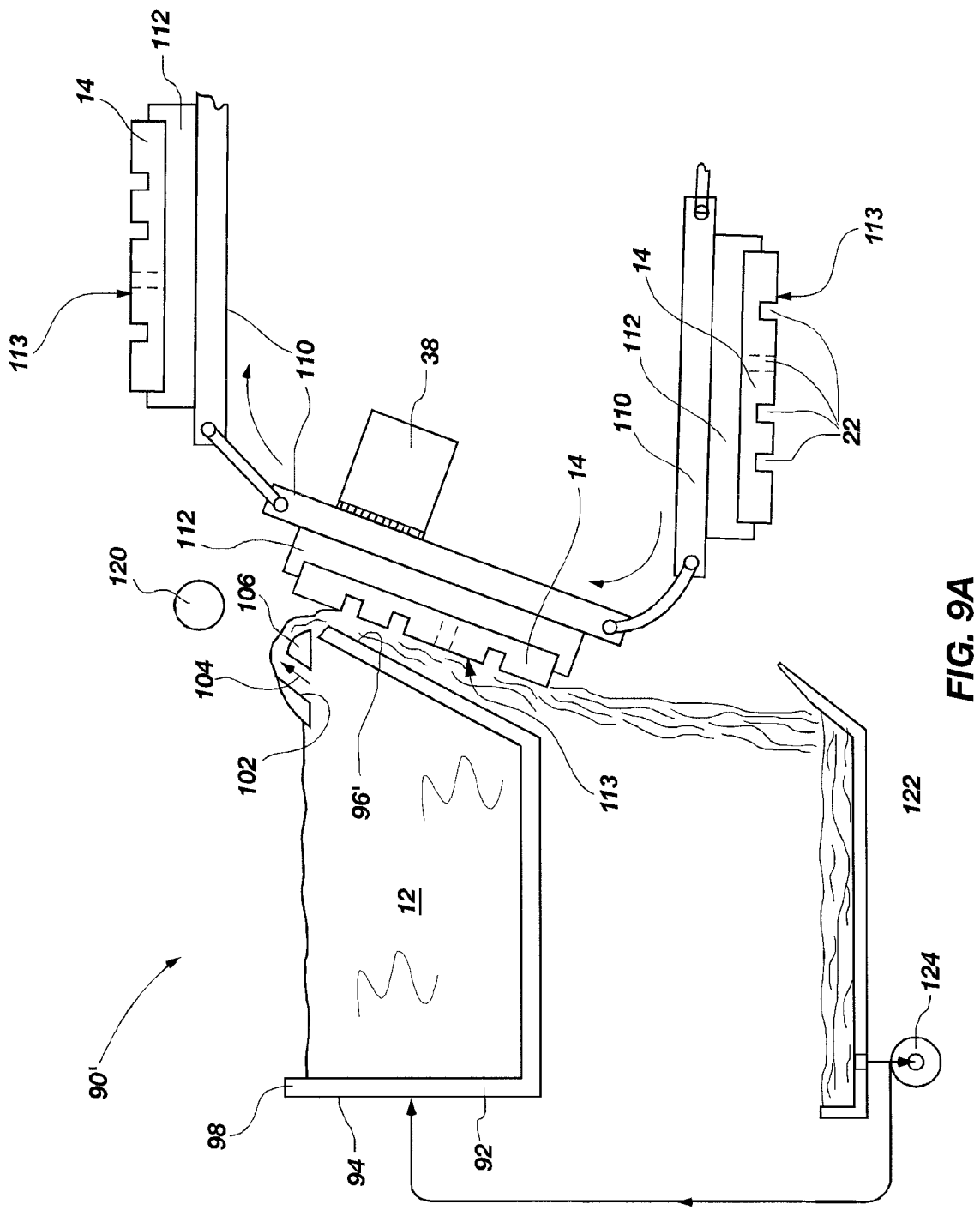

METHODS FOR PLACING SUBSTRATES IN CONTACT WITH MOLTEN SOLDER

CROSS-REFERENCE TO RELATED APPLICATION

This application claims the benefit of Provisional Patent Application Ser. No. 60/606,798, filed Sep. 1, 2004. This application is also related to U.S. patent application Ser. No. 11/777,137, filed Jul. 12, 2007, now abandoned.

BACKGROUND OF THE INVENTION

1. Field of the Invention

The present invention relates generally to electronic component fabrication. More particularly, the present invention relates to methods and apparatus for placing a substrate, such as a semiconductor wafer or other bulk substrate, in contact with molten solder to fill apertures therein.

2. State of the Art

Semiconductor dice are conventionally produced with integrated circuits on a so-called "active surface" and may be configured to connect to other electronic components including other semiconductor dice as well as passive components forming, in combination, an electronic system. Conductively lined or filled apertures or holes (e.g., vias) and other electrical interconnects, such as bond pads, conductive traces and discrete conductive elements, such as solder or other conductive bumps, balls, studs, pillars and other structures, may be fabricated on a semiconductor die to facilitate connection to the other electronic components. One approach to effecting electrical connections includes the use of solder.

Wave soldering is a method used conventionally to form solder bumps on bond pads of semiconductor wafers, as well as connections on a printed circuit board (PCB), by placing a PCB in a substantially horizontal orientation (usually at a slight angle to the horizontal) in contact with a wave of molten solder that flows upwardly from a nozzle as the PCB is moved horizontally thereover. Horizontal wave soldering has been used to coat terminal pads and fill through holes extending between opposing surfaces of a PCB. Capillary action in combination with wettability of a metal lining of the through holes may be used to draw the molten solder into the through holes during the wave soldering process. Excess molten solder is removed from the PCB by moving the PCB up and away from the molten solder, so that gravity and surface tension separate the molten solder from that remaining on the PCB. In one conventional wave soldering process, the surfaces of the PCB that are to soldered are fluxed, the PCB is preheated, the solder wave is effectuated to contact the PCB, and an air knife is used to dislodge un-adhered solder from the surfaces of the PCB.

Although horizontal wave soldering is useful in coating terminal pads and filling through holes in PCBs, the process has exhibited certain limitations. For instance, the inclusion of surface mount components on the PCB and the continual decrease in size of line widths, spacing between adjacent through holes, and distance between leads makes efficient wave soldering difficult. Defects, such as solder skips resulting from a lack of sufficient solder or the formation of solder bridges and solder icicles resulting from excess solder, may exist and create quality issues during the manufacture of the PCBs.

Drag soldering involves lowering a pallet that supports a through-hole printed wiring board bearing electronic components having leads disposed in the through holes into a solder bath until the printed wiring board contacts the solder. The printed wiring board is dragged a predetermined distance along the surface of the solder bath, after which the printed wiring board is lifted from the bath. Excess solder drains from the printed wiring board after being removed from the solder bath. However, drag soldering often results in soldering defects, including bridging and the deposition of excess solder on the bottom side of the printed wiring board.

In hot air solder leveling (HASL), a PCB is fluxed and then contacted with heated, molten solder while in a vertical orientation such that fluxed conductors and connectors are solder coated. The PCB is brought into contact with the solder by immersion or dipping of the PCB into a solder pot or bath. After the PCB is removed from the molten solder, the PCB is passed between hot gas jets, knives, slots or orifices through which heated, compressed gas is flowing. The heated, compressed gas is at a pressure and temperature such that excess solder is removed and cleared from through-holes in the PCB while leaving solder on surface mount features thereon.

Other known processes of filling openings include chemical vapor deposition (CVD), physical vapor deposition (PVD), electroless deposition, and electroplating. However, each of these processes may form voids or keyholes in the conductive filling of a via as the width of the via decreases in size. Further, these processes are time consuming and expensive.

BRIEF SUMMARY OF THE INVENTION

The present invention, in a number of exemplary embodiments, overcomes the above-referenced difficulties by providing methods and apparatus for placing a semiconductor wafer or other bulk substrate having apertures therein in contact with molten solder to fill the apertures. The methods and apparatus of the present invention provide faster and more economical soldering than known approaches, and produce a superior product in terms of a void-free conductive via filling. The methods and apparatus of the present invention are also advantageous in comparison to conventional techniques, in that they are not primarily dependent on meniscus or wicking effects of solder, as is the case with many conventional techniques. For instance, in one exemplary embodiment, the methods and apparatus described herein enable molten solder to access through holes in the semiconductor wafer or other substrate from both sides of the through hole. In other exemplary embodiments, the methods and apparatus described herein facilitate the filling of blind holes in semiconductor wafers or other substrates since the exit of air present in the blind hole and displacement thereof by molten solder is facilitated to avoid air trapping and consequent void formation in the solder after solidification.

One exemplary embodiment of the present invention comprises a vertical wave soldering apparatus. The wave soldering apparatus includes a solder bath for containing molten solder, wherein the solder bath is configured to cause a wave of solder to exit the solder bath and flow over the sidewall. The wave soldering apparatus also includes at least one jig configured to orient a substrate in a substantially vertical direction and place a surface of the substrate in contact with the solder wave as the solder wave exits the solder bath. The wave soldering apparatus may further comprise a conveyor for moving the at least one jig substantially vertically upwardly during contact with the downwardly flowing molten solder, horizontally and sideways across the downwardly flowing molten solder, or at a diagonal both upwardly and sideways across the downwardly flowing molten solder.

In another exemplary embodiment, a vertical wave soldering apparatus includes a solder bath for containing molten solder and a nozzle for producing a cascading solder wave that exits the solder bath over a sidewall thereof. The wave soldering apparatus also includes at least one jig configured to orient a substrate in a substantially vertical direction and place a surface of the substrate in contact with the solder wave as the solder wave exits the solder bath. The wave soldering apparatus may further comprise a conveyor for moving the at least one jig substantially carrying a substantially vertically oriented substrate substantially vertically upward during contact with the downwardly flowing molten solder, horizontally and sideways across the downwardly flowing molten solder, or at a diagonal both upwardly and sideways across the downwardly flowing molten solder.

In yet another exemplary embodiment of a vertical wave solder apparatus, a solder bath may be configured to cause molten solder to exit over the sidewall thereof in conjunction with solder flow provided by a solder nozzle, the nozzle-driven flow enhancing the gravity-driven flow over the sidewall using mass transfer effects.

It is also contemplated that a conveyor, as employed in any of the aforementioned embodiments, may be oriented to carry a semiconductor substrate along a path, which lies at an acute angle to the vertical, so that a surface of the semiconductor substrate to be exposed to the cascading molten solder is facing slightly upwardly. In a substrate including, for example, openings therein in the form of blind vias, such an orientation may facilitate displacement of air from the openings to avoid air trapping therein.

In yet a further embodiment, an apparatus for placing a semiconductor wafer in contact with solder is disclosed. The apparatus includes a solder bath for containing molten solder, a fixture configured to secure and orient a semiconductor wafer in a substantially vertical orientation and an apparatus bearing the fixture for immersing a semiconductor wafer carried by the fixture in the molten solder and withdrawing it therefrom. A plurality of fixtures, each configured to secure at least one semiconductor wafer thereto, may be employed to substantially simultaneously immerse a plurality of semiconductor wafers. The one or more fixtures may be configured to orient the semiconductor wafers at an acute angle to the vertical. The apparatus bearing the fixture or fixtures may have associated therewith a drive for moving the fixture or fixtures substantially horizontally in the solder bath, either in a single direction prior to withdrawal of the fixtures therefrom, or in alternating, opposing directions. A vibrator may be associated with the fixtures or the apparatus bearing them for facilitating displacement of air from vias being filled with molten solder.

Another embodiment encompasses a wave soldering apparatus comprising a solder bath and a nozzle for producing a solder wave. The wave soldering apparatus further includes at least one jig configured to orient a semiconductor wafer in a substantially horizontal orientation and place the semiconductor wafer in contact with the solder wave. A conveyor may be employed to move the at least one jig past a solder wave produced by the nozzle in a direction counter to that of the solder wave flow. The conveyor may be oriented at a slight angle to the horizontal over the solder bath to cause a surface of a semiconductor wafer to contact the solder wave at such an angle.

A further embodiment of the invention comprises a method of forming at least one solder bump on a semiconductor wafer or other substrate. The method includes forming a mask layer having at least one opening on a surface of a substrate, wherein the at least one opening in the mask layer exposes a portion of a surface of the substrate to which solder is wettable. The method further includes placing the substrate in a substantially vertical orientation and placing the substantially vertically oriented substrate in contact with molten solder to fill the at least one opening in the mask layer and contact the exposed portion of the surface of the substrate. The molten solder may be allowed to substantially solidify and the mask layer removed, leaving a substantially solid solder bump on the surface of the substrate. As desired, the substrate may be heated to reflow the solder and form a solder ball.

In yet a further embodiment, a method of placing a substrate in contact with molten solder includes placing the substrate in a substantially vertical orientation and contacting it with downwardly flowing molten solder. Upward motion of the substrate may be employed in conjunction with the downward flow of solder. As desired, the substrate may be oriented at an acute angle to the vertical to facilitate displacement of air from openings, such as blind vias or through vias, in the substrate surface. The substrate may be vibrated to further facilitate air displacement and filling of the openings. The substantially vertically oriented substrate is placed in contact with the cascading solder wave. Variations of this embodiment include moving the substrate horizontally across and in contact with the downwardly moving molten solder, and moving the substrate both horizontally and upwardly in a diagonal direction in contact with the downwardly moving molten solder. The substrate may be vibrated while in contact with the molten solder.

In a further exemplary embodiment, a method of placing a semiconductor wafer in contact with molten solder includes providing a bath of molten solder and placing a semiconductor wafer in a substantially vertical orientation. The substantially vertically oriented semiconductor wafer is immersed in and then withdrawn from the molten solder. The semiconductor wafer may include blind or through vias to be filled with the molten solder. The semiconductor wafer may be oriented at an acute angle to the vertical with mouths of the openings facing slightly upwardly to facilitate air displacement from the openings by the molten solder. The semiconductor wafer may be moved horizontally in the molten solder in a direction substantially perpendicular to a plane of the semiconductor wafer, either in a single direction or in alternating directions. The semiconductor wafer may be vibrated while immersed in the molten solder.

In another embodiment, a method of placing a semiconductor wafer or other substrate in contact with solder comprises placing a semiconductor wafer or other substrate, including blind vias, in a substantially horizontal orientation with the via mouths facing downwardly and forming a solder wave in a bath of molten solder. The substantially horizontally oriented semiconductor wafer or other substrate is placed in contact with the solder wave to substantially fill the blind vias with molten solder. The semiconductor substrate may be moved substantially horizontally, such term including movement at an acute angle to the horizontal, in a direction counter to that of flow of the solder wave. The semiconductor wafer or other substrate may then be inverted, again to a substantially horizontal orientation but with the via mouths facing upward, and heated to reflow the solder and remove any air initially trapped in the solidified solder. In a variation of this embodiment, a semiconductor wafer or other substrate, including blind vias, is placed in a bath of molten solder while in a substantially vertical orientation to substantially fill the blind vias. The semiconductor wafer or other substrate is then placed in a substantially horizontal orientation with mouths of the blind vias facing upwardly and heated to reflow the solder and remove any trapped air. A reduced pressure atmosphere may be employed to assist in the evacuation of air from the blind vias.

BRIEF DESCRIPTION OF THE SEVERAL VIEWS OF THE DRAWINGS

In the drawings, which illustrate what is currently considered to be the best mode for carrying out the invention:

FIG. 9A is a schematic side view of a variation of the embodiment of FIG. 9;

DETAILED DESCRIPTION OF THE INVENTION

Figure 1:
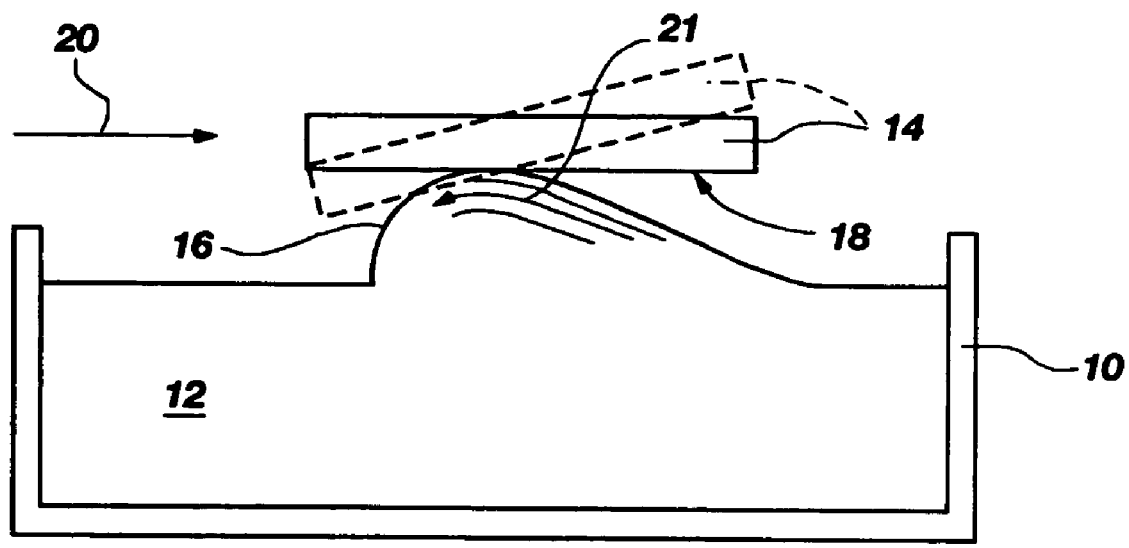
FIG. 1 is a schematic side view of one exemplary embodiment of a solder bath of the present invention.

Generally, the present invention includes methods and apparatus for placing a semiconductor wafer or other substrate in contact with molten solder. The contact of the semiconductor wafer or other substrate with the molten solder may be used to facilitate the filling of blind holes or vias, the filling of through holes in the substrate or semiconductor wafer, or the coating of other, solder-wettable structures. As used herein, the term "semiconductor wafer" means and includes not only conventional monocrystalline silicon wafers, but also partial wafers and wafers of other semiconductive materials such as germanium, gallium arsenide and indium phosphide as well as other bulk semiconductor substrates such as silicon-on-insulator (SOI) substrates as exemplified by silicon-on-sapphire (SOS) and silicon-on-glass (SOG) substrates.

Referring to the accompanying drawings, wherein similar features and elements are identified by the same or similar reference numerals, various embodiments of methods and devices for placing a semiconductor wafer or other substrate in contact with solder are illustrated. It will be apparent to those of ordinary skill in the art that while the embodiments described herein illustrate methods and devices for placing a semiconductor wafer or other substrate in contact with solder, the acts described and claimed herein comprise only a portion of an extensive and complex series of processes for fabrication of electronic components and may be combined with other semiconductor fabrication processes. Similarly, the apparatus described and claimed herein comprise part of an extensive and complex suite of apparatus for fabrication of electronic components. Further and as indicated with respect to specific embodiments below, it is noted that the present invention contemplates implementation of all of the embodiments of the inventive method and apparatus in an atmosphere other than ambient air, and specifically that application of solder according to the present invention may be conducted in an inert atmosphere such as, for example, a nitrogen atmosphere. Accordingly, all references to the term "air" herein are to be broadly construed as merely indicative of a gas or combination of gases, without limitation.

Figure 2:
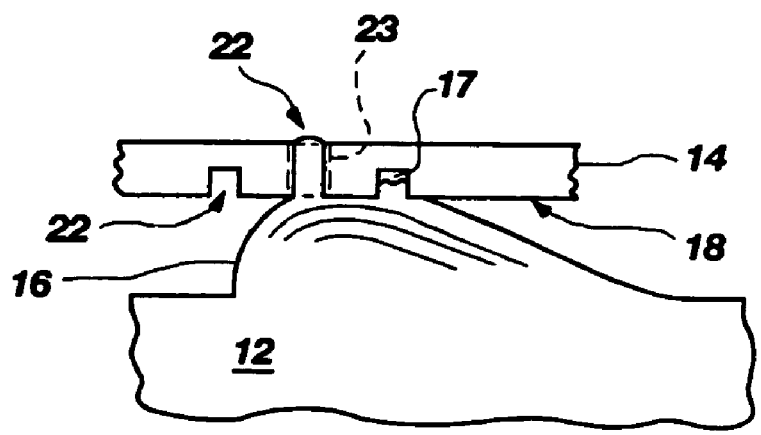
FIG. 2 illustrates an enlarged, cross-sectional schematic view of one exemplary embodiment of placing a semiconductor wafer in contact with molten solder, using the solder bath of FIG. 1.

Referring now to FIGS. 1 and 2, there are shown side views of acts involved in placing a semiconductor wafer 14 in contact with molten solder 12. By placing the semiconductor wafer 14 in contact with the molten solder 12, any openings in the semiconductor wafer 14, such as blind vias or through vias, may be filled with molten solder 12, or any surfaces of the semiconductor wafer 14, such as bond pads, may be wetted with the molten solder 12 for further electrical contact formation. FIG. 1 is a cross-sectional, side view of a solder bath 10 having molten solder 12 placed therein. The solder bath 10, or tank, may be associated with other components of a solder wave apparatus including, but not limited to, a nozzle for forming a solder wave, a solder wave guide, a preheating element, a fluxing device, and other components. Some of these components, which are conventional, are not illustrated in FIG. 1 for ease of illustration. A semiconductor wafer 14 is illustrated in a substantially horizontal orientation. The semiconductor wafer 14 may comprise an unprocessed semiconductor wafer, an intermediate semiconductor wafer having various process layers formed thereon including a plurality of semiconductor die locations having active devices as well as associated bond pads, or a fully processed semiconductor wafer comprising a plurality of completed but unsingulated semiconductor dice. In the exemplary embodiment, the semiconductor wafer 14 comprises a silicon wafer.

The molten solder 12 may comprise one of a variety of formulations including molten metal or an alloy, such as tin/lead, tin/antimony, or tin/silver/copper. Specifically, the molten solder 12 may comprise, by way of example only, 95% Pb/5% Sn, 60% Pb/40% Sn, 63% In/37% Sn, 100% Sn, or 62% Pb/36% Sn/2% Ag. Such alloys are suitable to wet a metallization structure on semiconductor wafer 14 or fill a blind or through via therein. As used herein, the term "molten solder" means and encompasses metals and alloys, without limitation, in a molten state. In one exemplary embodiment wherein the substrate comprises a semiconductor wafer, such as a silicon wafer bearing integrated circuitry, the metal or alloy of the molten solder 12 may have a melting point of between about 180° C. and about 300° C., so as to not damage the circuitry. A method of placing the semiconductor wafer 14 in contact with the molten solder 12 includes placing the semiconductor wafer 14 in a substantially horizontal orientation as illustrated in FIG. 1. The substantially horizontally oriented semiconductor wafer 14 is positioned above the molten solder 12, such that a wave 16 of the molten solder 12 is caused to contact a first surface 18 of the semiconductor wafer 14. In another embodiment shown in broken lines in FIG. 1, the semiconductor wafer 14 may be oriented at an acute angle to the horizontal before contacting the solder wave 16 in order to facilitate removal of any air in openings of the semiconductor wafer 14 as it is displaced by molten solder 12. The solder wave 16 may be produced using a pump driving molten solder through a nozzle (both not shown) using conventional techniques. As exemplified in FIG. 1, a size and shape of the solder wave 16 of molten solder 12 may be controlled with the pump and nozzle such that the solder wave 16 contacts the first surface 18 of the semiconductor wafer 14 in a controlled, predictable manner.

As shown, the substantially horizontally oriented semiconductor wafer 14 is slowly moved over the solder bath 10 in a substantially horizontal direction as illustrated by arrow 20. The semiconductor wafer 14 is moved in a direction opposite to that, as shown by arrow 21, in which the solder wave 16 is traveling. The semiconductor wafer 14 may be moved over the solder bath 10 using conventional conveying apparatus, such as with a jig suspended from a moving conveyor (not shown) traveling over solder bath 10. In acts associated with the contacting of semiconductor wafer 14 with molten solder 12, the semiconductor wafer 14 may be further subjected to conventional processing acts, such as fluxing, before being placed in contact with the molten solder 12, preheating to activate the flux before being placed in contact with the molten solder 12 and washing or cleaning to remove excess flux after exposure to the molten solder 12. Further, the semiconductor wafer 14 may be moved past an air knife prior to washing or cleaning, in order to remove excess solder therefrom after being placed in contact with the molten solder 12, the excess molten solder 12 then being returned to the solder bath 10. Of course, as used in the context of the environment in which application of solder is conducted, the term "air" as well as the term "air knife" are to be construed broadly as encompassing any gas or combination of gases, and specifically the use of inert gases, such as nitrogen, for the soldering environment as well as for gas streams emanating from air knives and the like.

Fluxing is employed to clean surfaces of the semiconductor wafer 14, such as by removing native oxides and other contaminants from the surfaces of any metals, such as nickel, copper, gold, platinum or any other plating material, intended for exposure to and wetting by the molten solder 12, such materials being used for electrical contact such as bond pads or placed in blind or through vias present in the semiconductor wafer 14.

Figure 11:
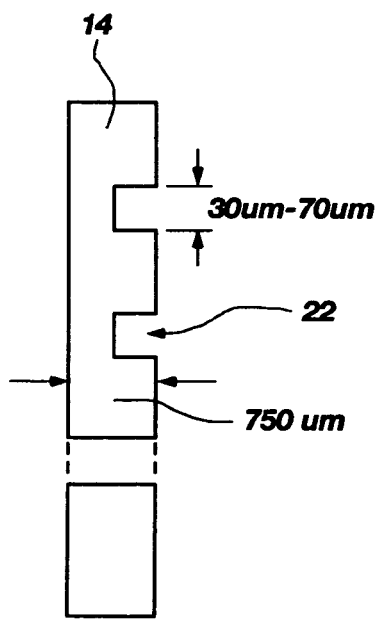
FIG. 11 is a cross-section of one exemplary embodiment of a semiconductor wafer used in the methods of the present invention.

Referring to FIG. 2, there is shown an enlarged, cross-sectional side view of the semiconductor wafer 14 having openings 22, which may comprise blind vias, through vias (both of which are illustrated in FIG. 2), or other cavities formed therein. The openings 22 may be formed in the semiconductor wafer 14 by one or a combination of several of laser drilling or ablation, dry etching (reactive ion etch), photochemical etching, masking, patterning and anisotropic wet etching, mechanical drilling, or any other known technique. In one exemplary technique, the openings may be laser ablated and then cleaned to remove heat-damaged substrate material adjacent the openings (a so-called "heat affected zone," or HAZ) using a 6% tetramethyl ammonium hydroxide (TMAH) in propylene glycol solution, which does not adversely affect metallization on the semiconductor wafer. As illustrated, the molten solder 12 of solder wave 16 is driven into the mouths of openings 22 and at least partially fills openings 22 as the semiconductor wafer 14 contacts the solder wave 16. Surface tension of the molten solder 12, which may be amplified by the use of a solder-wettable metal lining in openings 22, is retained in openings 22 of the semiconductor wafer 14 such that the openings 22 are substantially filled with the molten solder 12. In this manner, substantially solidly filled, conductive through wafer interconnects (TWIs) may be formed when an opening 22 is a through-hole as capillary action will tend to draw the molten solder 12 into the through-hole and retain it therein. Solidification of the molten solder 12 in a through hole helps hold the molten solder 12 in the through hole. As noted above, the openings 22 may optionally be coated with a material layer 23 (shown in broken lines) wettable by the solder that enables the molten solder 12 to more effectively fill the opening 22 and be retained therein while in a molten state. For instance, the openings 22 may be coated or lined with a metal, such as copper or nickel. In other embodiments, if the diameter or other lateral dimension of the openings 22 is small, the openings 12 may be coated or partially filled with copper for lower resistance. A representative through via in a semiconductor wafer 14 of the present invention may have a depth of up to about 750 μm (an exemplary, nominal wafer thickness before back grinding) and a diameter of about 25 μm or 30 μm to about 70 μm or wider as illustrated in FIG. 11. A blind via may have a lesser depth, as not extending completely through the semiconductor wafer 14.

If openings 22 comprise blind vias, complete filling thereof and elimination of voids due to trapped air may be effected by inverting the semiconductor wafer 14 to another, oppositely facing substantially horizontal orientation with mouths of openings 22 facing upwardly, followed by heating of semiconductor wafer 14 to reflow the solder in blind via openings 22 and remove air therefrom. This process may be facilitated by gently vibrating the semiconductor wafer when the solder becomes molten. High frequency vibrations, such as ultrasonic or even megasonic vibrational energy, may be employed. In addition, the reflow may be conducted in a reduced pressure atmosphere, such as a partial or substantially complete vacuum, to aid in filling of the blind via openings 22.

Figure 3:
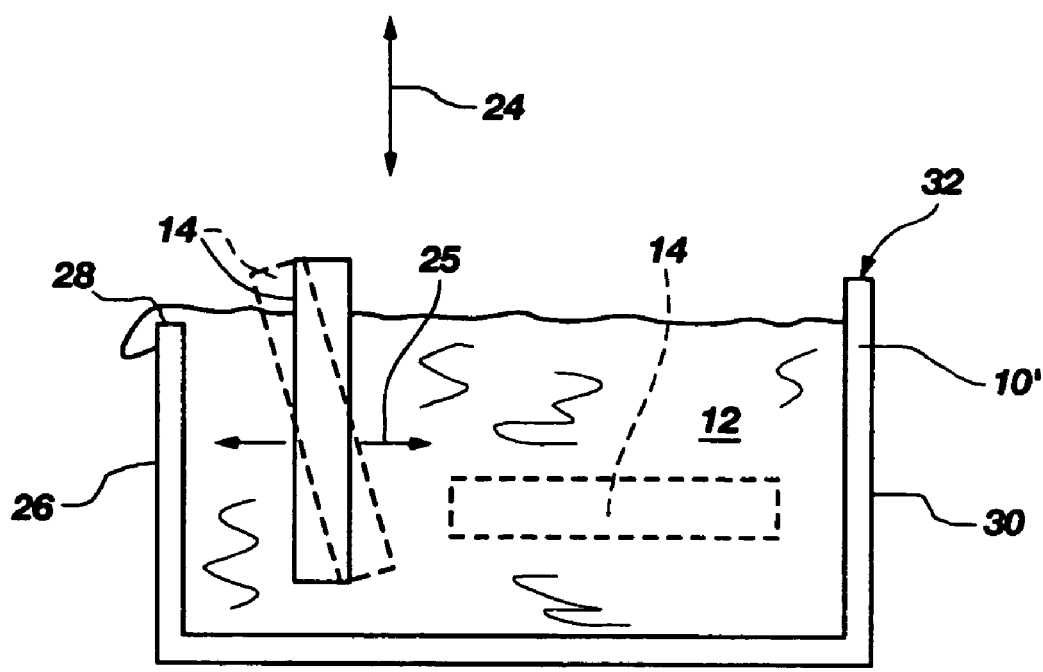
FIG. 3 depicts a schematic side view of another exemplary embodiment of a solder bath of the present invention.
Figure 4:
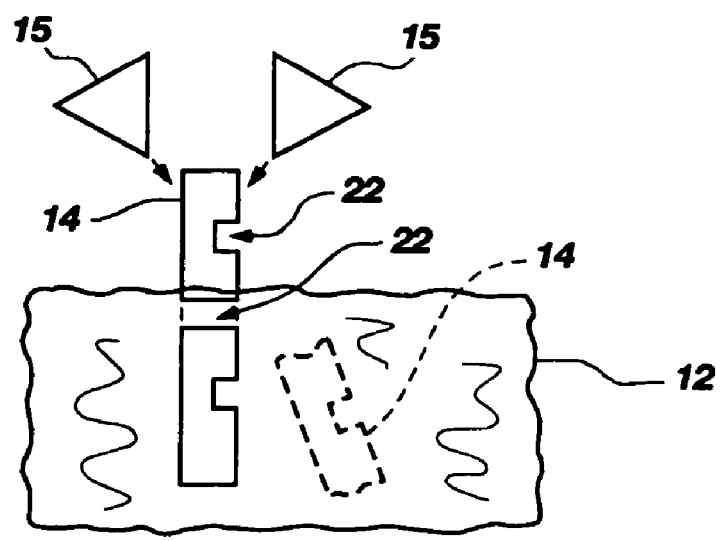
FIG. 4 illustrates an enlarged, cross-sectional schematic view of another exemplary embodiment of placing a semiconductor wafer in contact with molten solder, using the solder bath of FIG. 3.

FIGS. 3 and 4 show side views of acts involved in another embodiment of placing a semiconductor wafer 14 in contact with molten solder 12. FIG. 3 is a cross-sectional, side view of a solder bath 10' having molten solder 12 therein. The semiconductor wafer 14 is illustrated in a substantially vertical orientation and may be moved upwardly and downwardly in a vertical direction as illustrated with arrows 24 using a jig, hanger or other structure (not shown). The semiconductor wafer 14 may, optionally, also be moved substantially horizontally as illustrated with arrows 25, either in a single direction substantially perpendicular to a plane of the semiconductor wafer 14 or in alternating fashion in opposing directions. The semiconductor wafer 14 is placed in contact with the molten solder 12 by lowering the substantially vertically oriented semiconductor wafer 14 into the molten solder 12. The semiconductor wafer 14 may be completely immersed in the molten solder 12, or immersed to a selected depth in order to place structures (not shown) on the semiconductor wafer 14 in contact with the molten solder 12. As shown in broken lines, the semiconductor wafer 14 may be oriented at an acute angle to the vertical in a range of angles during immersion in the molten solder 12 in order to facilitate the displacement of air in openings 22 (see FIG. 4) of the semiconductor wafer 14 by the molten solder 12. In yet another embodiment and as shown in broken lines, the semiconductor wafer 14 may be oriented in a substantially horizontal direction and immersed in the molten solder 12. The time that the semiconductor wafer 14 is immersed may be extended as desired in order to provide for an adequate soaking time of the semiconductor wafer 14 and fill even extremely small through or blind vias.

A top edge 28 of a first wall 26 of the solder bath 10' may be, at least somewhat, lower than a top edge 32 of an opposing, second wall 30 of the solder bath 10'. In this manner, some of the molten solder 12 is enabled to exit the solder bath 10' such that any dross in the molten solder 12 proximate the top surface thereof may be removed from the molten solder 12 exiting solder bath 10' and cleaned, molten solder 12 may then be returned to the solder bath 10'. As is conventionally known, dross is a waste byproduct of a soldering operation and may include a metal oxide, such as a tin or lead oxide, or both, as well as other contaminants from the semiconductor wafers or components formed on the semiconductor wafers. As in the case of the previous embodiment, the semiconductor wafer 14 may be fluxed and preheated before placement in the molten solder 12 and cleaned thereafter.

Referring to FIG. 4, there is shown an enlarged, cross-sectional schematic side view of a portion of the semiconductor wafer 14 in the molten solder 12. The semiconductor wafer 14 has openings 22 formed therein and as depicted in FIG. 4, the substantially vertical orientation of the semiconductor wafer 14 enables the molten solder 12 to quickly fill the openings 22 and displace the air therein. If an opening 22 extends through the semiconductor wafer 14, such as a through-hole opening, the molten solder 12 will be able to fully penetrate the opening 22 from both sides of the semiconductor wafer 14 and drive air out of the openings 22. If the opening 22 is a blind via or other type of opening that may tend to trap air therein, the substantial vertical orientation of the semiconductor wafer 14 allows the molten solder 12 to flow into the opening 22 from the bottom sides thereof (referring to the orientation of the openings 22 with semiconductor wafer 14 in a substantially vertical orientation), displace the air out of the opening 22 and, thus, substantially fill the opening 22 with molten solder 12. For instance, as shown in FIG. 2, when the semiconductor wafer 14 is substantially, horizontal, air 17 may be trapped in the opening 22 configured as blind vias, whereas with the substantially vertically oriented semiconductor wafer of FIG. 4, air 17 is not trapped in the opening 22 configured as a blind via. As shown, a hot air knife 15 may be placed in relation to the semiconductor wafer 14 such that a downwardly directed hot gas stream may be caused to contact the semiconductor wafer 14 as the semiconductor wafer 14 is removed from the molten solder 12. In this manner, the hot gas may "squeegee" excess molten solder 12 off the surfaces of the semiconductor wafer 14. As described with respect to FIG. 3 and as depicted in broken lines in FIG. 4, semiconductor wafer 14 may be oriented at an acute angle to the vertical with mouths of openings 22 formed as blind vias facing slightly upwardly to facilitate the exit of air 17 therefrom as molten solder 12 enters thereinto.

As one approach to implementing the method of the preceding embodiment, a conventional hot air solder leveling (HASL) apparatus used to place circuit boards in contact with molten solder may be modified to place a semiconductor wafer in contact with the molten solder in accordance with the present invention. In this approach, a jig or other carrier device of the HASL apparatus used to hold a printed circuit board may be modified to accommodate one or more semiconductor wafers. In another approach, the sizes of the various components of a conventional HASL apparatus may be reduced to accommodate processing of semiconductor wafers.

Figure 5:
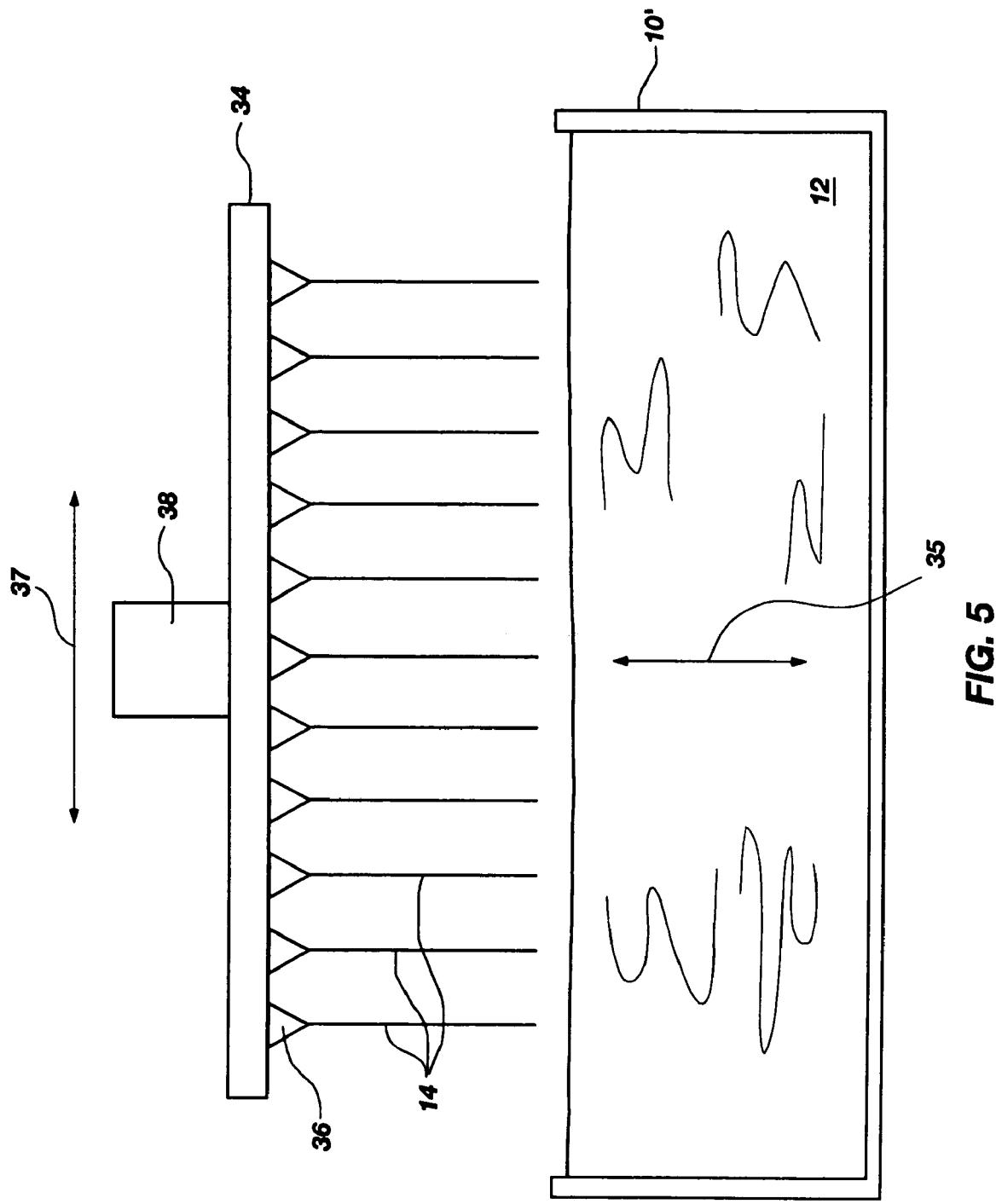
FIG. 5 is a schematic side view of yet another exemplary embodiment of a solder bath of the present invention.

Referring now to FIG. 5, there is shown another embodiment of an apparatus of the present invention. The solder bath 10' of FIG. 5 may be substantially similar to the solder bath 10' of FIG. 3, and be sized and configured to carry a plurality of substantially vertically oriented semiconductor wafers 14. A fixture 34 is configured with a plurality of hangers 36 for positioning the plurality of semiconductor wafers 14 in mutually laterally spaced relationship in the substantially vertically oriented position. The fixture 34 is lowered to cause the plurality of semiconductor wafers 14 to be substantially simultaneously immersed, by dipping, in the molten solder 12, thus placing the semiconductor wafers 14 in contact with the molten solder 12, and then withdrawn, as shown by arrows 35. As discussed with reference to FIG. 4, the hangers 36 may be configured to position the semiconductor wafers 14 at an acute angle to the vertical during dipping and immersion in the molten solder 12 in order to facilitate the displacement of air in openings 22 (not shown in FIG. 5) of the semiconductor wafers 14. The fixture 34 enables multiple semiconductor wafers 14 to be contacted with the molten solder 12 simultaneously and, thus, may be used to quickly effectuate the filling of a plurality of openings in the plurality of wafers 14. As discussed with respect to FIG. 3, the solder bath 10' of FIG. 5 may be configured to have one wall of the solder bath 10' lower than the other walls such that the molten solder 12 may flow out of the solder bath 10' to remove dross therefrom, the cleaned molten solder 12 then being returned to solder bath 10'. The fixture 34, the hanger 36 of FIG. 5, or a jig or other fixture used to position any of the semiconductor wafers 14 of FIGS. 1 through 4 may be operably coupled to a vibrator 38 (shown in FIG. 5), such as an ultrasonic or megasonic vibrator, which may be used to gently vibrate or agitate the semiconductor wafer(s) 14 to aid in the removal of any air in any of the openings 22 during displacement by molten solder 12. Further, fixture 34 may be connected to a drive (not shown) for moving fixture 34 and its suspended semiconductor wafers, back and forth in solder bath 10' substantially transverse to the plane of semiconductor wafers 14 as shown by arrows 37 to enhance displacement of air residing in any through or blind vias (not shown) in semiconductor wafers 14 by molten solder 12.

Figure 6:
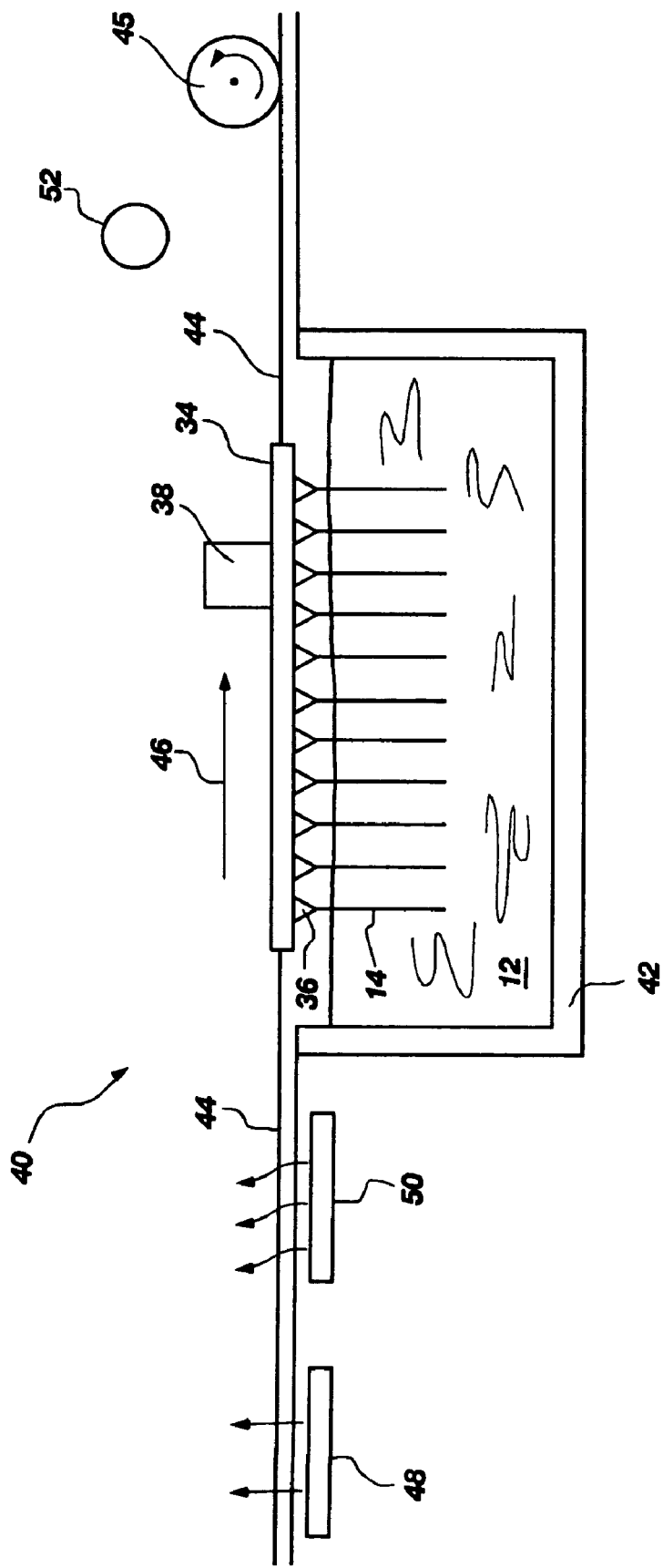
FIG. 6 schematically illustrates one exemplary embodiment of a horizontal drag solder apparatus of the present invention.

Another embodiment of a method of immersing a substantially vertically oriented semiconductor wafer 14 in molten solder 12 is shown in FIG. 6. A cross-sectional, side view of a drag solder apparatus is illustrated generally at 40. The drag solder apparatus 40 includes a solder pot 42 having molten solder 12, a fixture 34, such as a pallet carrying a plurality of hangers 36 for supporting a plurality of semiconductor wafers 14, and a conveyor 44 propelled by drive 45 for moving the fixture 34 through the drag solder apparatus 40. The drag solder apparatus 40 may further be configured with a dross skimmer apparatus (not shown) as known in the art for removing dross from the molten solder 12. As shown, the conveyor 44 moves the fixture 34 in a direction indicated by arrow 46. Although not depicted for the sake of simplicity, conveyor 44 may be disposed along its path of movement at a higher elevation before and after solder pot 42, dipping down toward solder pot 42 to submerge semiconductor wafers 14 therein, move them horizontally through solder pot 42 and then raise them out of solder pot 42. As the fixture 34 moves the plurality of semiconductor wafers 14 through the drag solder apparatus 40, the semiconductor wafers 14 may be passed through a number of additional stations. For instance, the semiconductor wafers 14 may pass by a fluxing device 48, such as a foam fluxing device, a wave fluxing device, or a spray fluxing device, wherein the semiconductor wafers 14 are treated with flux. The fluxing device 48 may further be configured with an air knife (not shown) to remove any excess flux from the semiconductor wafer 14 using a directed gas stream before the semiconductor wafer 14 contacts the molten solder 12. The semiconductor wafers 14 may also be preheated using a preheating device 50 such as an oven or heat lamps before being immersed in the molten solder 12. After the semiconductor wafers 14 are raised from the molten solder 12, the semiconductor wafers 14 may be passed by an air knife 52, which drives a stream of hot gas over the semiconductor wafers 14 to remove any excess molten solder 12, which is returned to solder pot 42.

As shown, the fixture 34 may be configured with a vibrator 38, such as an ultrasonic or megasonic vibrator, that may be used to vibrate the semiconductor wafers 14 such that the molten solder 12 may more easily enter any openings in the semiconductor wafers 14 and displace air contained therein. As previously discussed, semiconductor wafers 14 may be oriented at an acute angle to the vertical using suitably configured hangers 36 during immersion in the molten solder 12 in order to facilitate the removal of any air in openings of the semiconductor wafers 14.

Figure 7:
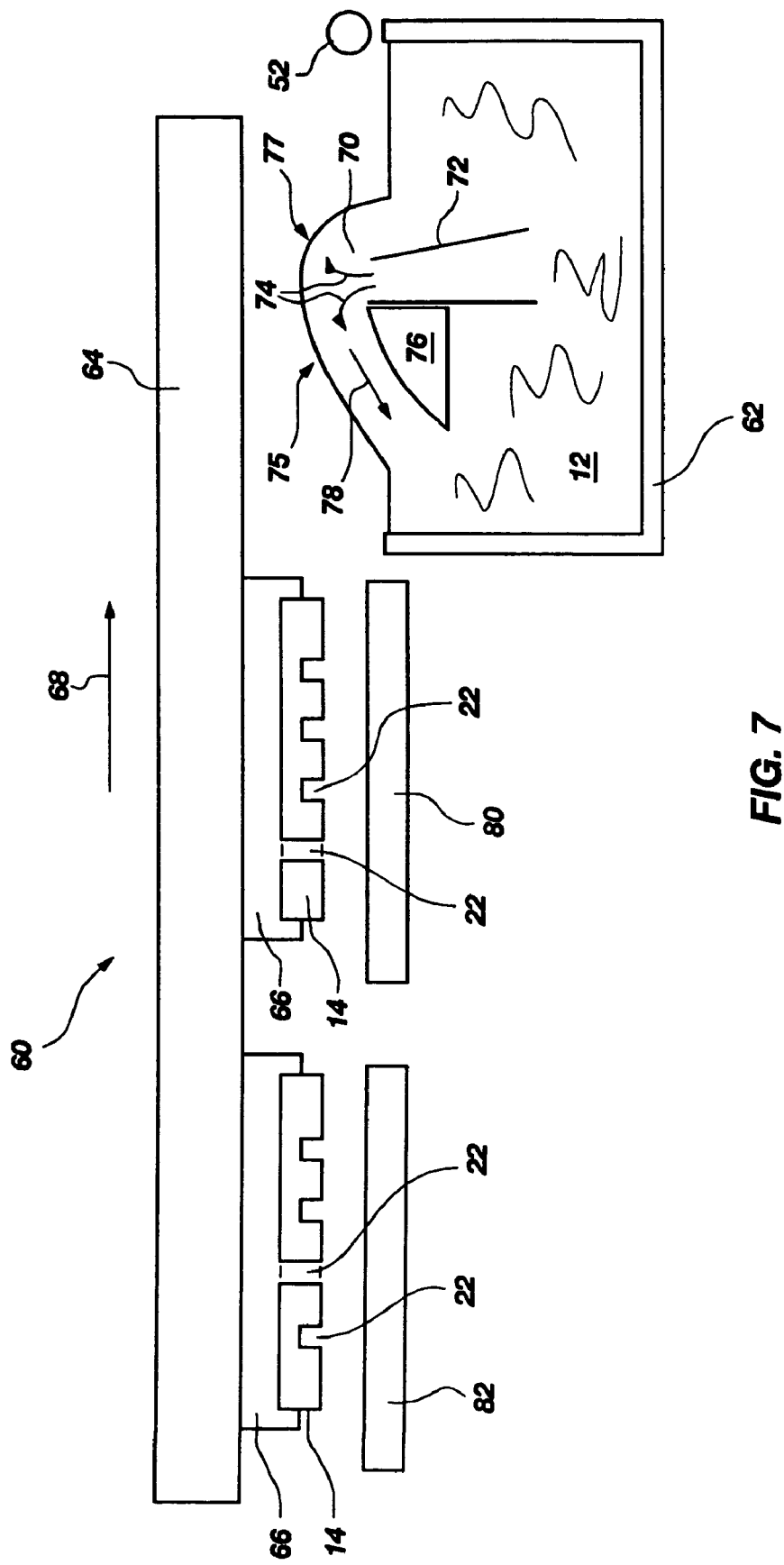
FIG. 7 depicts a schematic side view of one exemplary embodiment of a horizontal wave solder apparatus of the present invention.

Referring to FIG. 7, there is shown a side view of one exemplary embodiment of a horizontal wave soldering apparatus generally at 60. The horizontal wave soldering apparatus 60 includes a solder bath 62 and a conveyor 64 for imparting movement to semiconductor wafers 14, which may have one or more openings 22 formed therein. The conveyor 64 includes a plurality of jigs 66 for removably attaching the semiconductor wafer 14 to the conveyor 64. The conveyor 64 moves the semiconductor wafers 14 in a direction indicated by arrow 68. The solder bath 62 includes molten solder 12 and a solder wave 70 is formed by a pump (not shown) associated with the horizontal wave soldering apparatus 60 forcing molten solder 12 up through a solder nozzle 72. The solder wave 70 flows out of the solder nozzle 72 as indicated by arrows 74. Some of the molten solder 12 may flow over a solder wave guide 76, which may be used to give the solder wave 70 a predetermined shape. The shape of at least one of the solder nozzle 72 and the solder wave guide 76 may be varied in order to produce a turbulent flow portion of the solder wave 70 indicated at arrow 75 and a laminar (smooth) flow portion of the solder wave 70 indicated at arrow 77. For instance, the solder nozzle 72 and the solder wave guide 76 may be configured to produce the turbulent portion 75 of the leading edge of the solder wave 70, which initially contacts the semiconductor wafer 14 as the turbulence enables more scrubbing action of the solder wave 70. In this manner, the turbulent solder wave 70 is able to reach surfaces of and cavities in the semiconductor wafer 14 that may be physically obscured by various structures formed on the semiconductor wafer 14. The turbulence further fosters the removal of any outgassing from previously applied flux. As the laminar, smooth portion 77 of the solder wave 70 contacts the semiconductor wafer 14, the laminar, smooth portion 77 may remove excess molten solder 12 that may have been deposited by the turbulent portion 75 of the solder wave 70.

A portion of the solder wave 70 travels in a direction as indicated by arrow 78, which is, at least partially, opposite the direction that the semiconductor wafers 14 are moving as indicated by arrow 68. The horizontal wave soldering apparatus 60 may be configured with a preheating device 80 for preheating the semiconductor wafers 14 contact the solder wave 70, a fluxing device 82 for applying flux to the semiconductor wafers 14 before the semiconductor wafers 14 contact the solder wave 70, a device (not shown) for removing excess flux from the semiconductor wafers 14, an air knife 52 for removing or squeegee any excess molten solder 12 from the semiconductor wafers 14 using a directed hot gas stream, or a cleaning device (not shown) for cleaning the semiconductor wafers 14.

If openings 22 comprise blind vias, complete filling thereof and elimination of voids due to trapped air may be effected by inverting the semiconductor wafer 14 to another, oppositely facing substantially horizontal orientation with mouths of openings 22 facing upwardly, followed by heating of semiconductor wafer 14 to reflow the solder in blind via openings 22 and remove air therefrom. This process may be facilitated by vibrating the semiconductor wafer, for example with ultrasonic or megasonic vibrational energy, when the solder becomes molten. In addition, the reflow may be conducted in a reduced pressure atmosphere, such as a partial or substantially complete vacuum, to aid in filling of the blind via openings 22.

Figure 8:
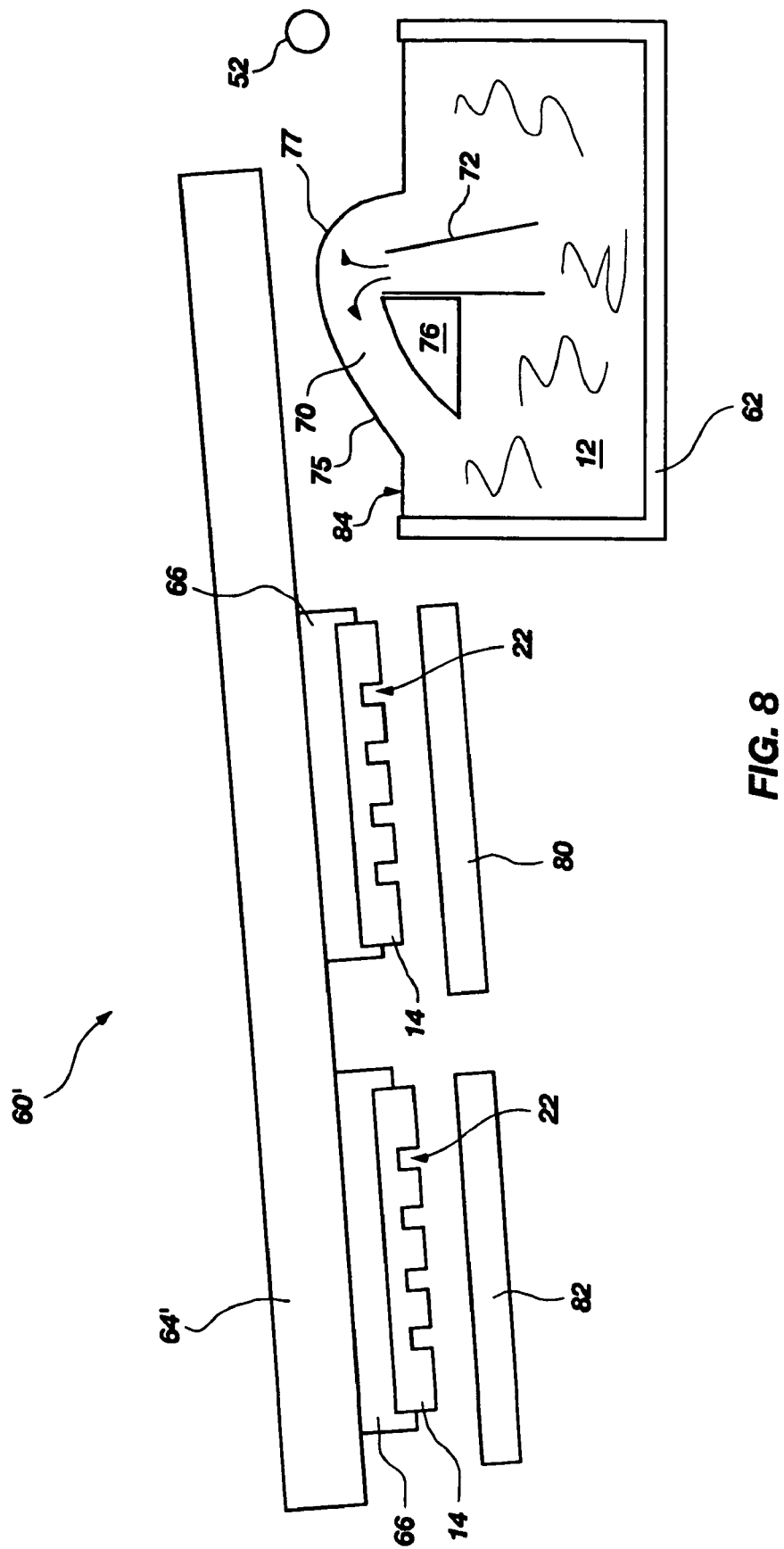
FIG. 8 is a schematic side view of another exemplary embodiment of a horizontal wave solder apparatus of the present invention.

Referring now to FIG. 8, a side view of another exemplary embodiment of a horizontal wave soldering apparatus is shown generally at 60'. The horizontal wave soldering apparatus 60' is substantially the same as the horizontal wave soldering apparatus 60 of FIG. 7, wherein a conveyor 64' of the horizontal wave soldering apparatus 60' of FIG. 8 is arranged and configured to cause jigs 66 and thus semiconductor wafers 14 to travel at an acute angle to the horizontal and thus at an acute angle in relation to a surface 84 of the molten solder 12 such that the semiconductor wafer 14 contacts the solder wave 70 at a beneficial angle to drive the molten solder 12 into openings 22. This angular orientation may help facilitate the removal of any air from openings 22 of the semiconductor wafers 14 such that the openings 22 are more easily filled with the molten solder 12. In one exemplary embodiment, the conveyor 64' may be angled from about 5° to about 8° to the horizontal. Of course, a horizontal conveyor in combination with jigs 66 configured to orient the semiconductor wafers at an angle of about 5° to about 8° to the horizontal may be employed in lieu of an angled conveyor in combination with a suitable configuration and orientation of solder wave 70.

Figure 9:
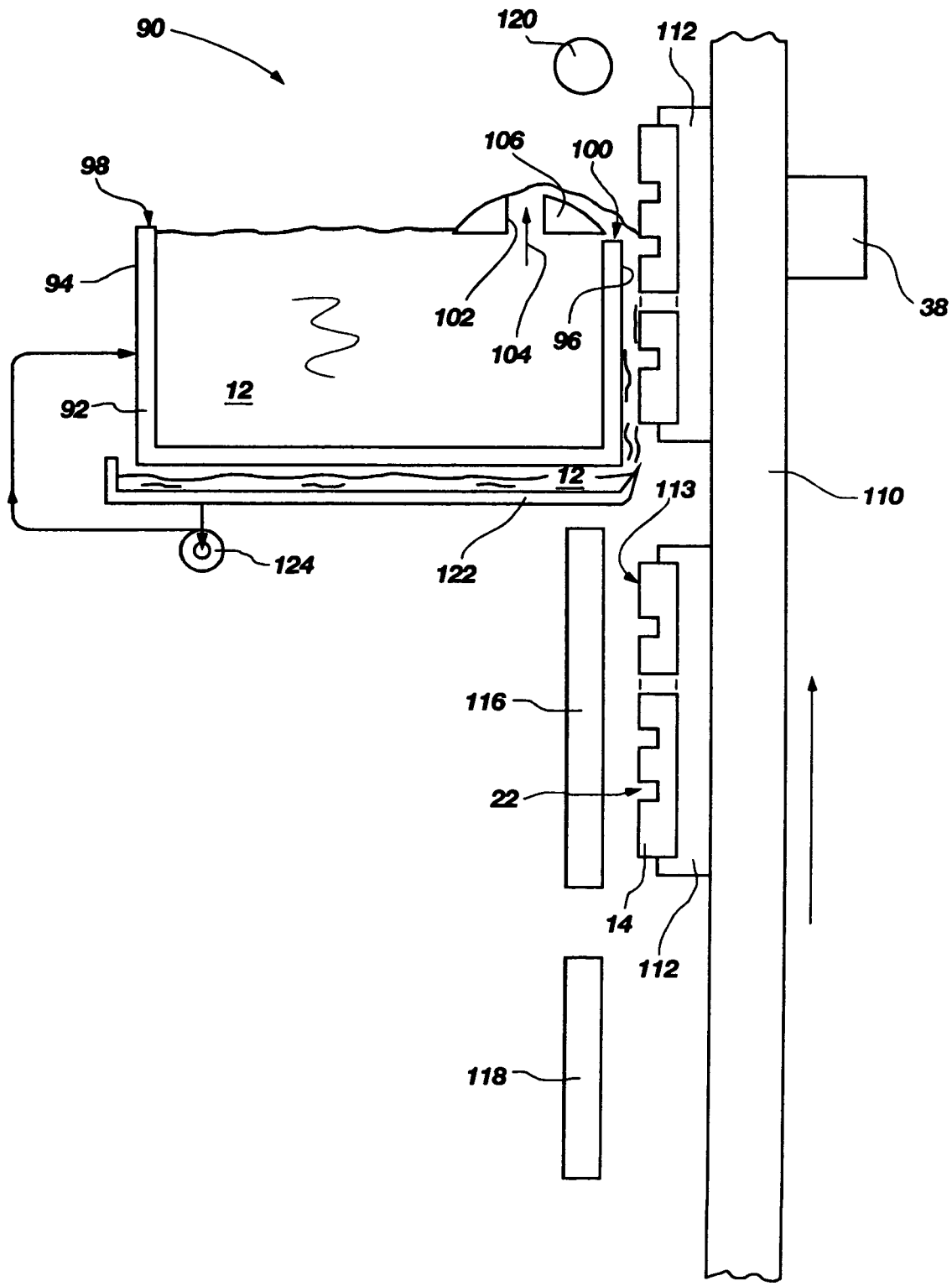
FIG. 9 is a schematic side view of one exemplary embodiment of a vertical wave solder apparatus of the present invention.

Referring now to FIG. 9, there is shown a side view of one exemplary embodiment of a vertical wave soldering apparatus designated generally at 90. In the illustrated embodiment, the vertical wave soldering apparatus 90 includes a solder bath 92 having a first sidewall 94 and an opposing, second sidewall 96. In one embodiment, a top 98 of the first sidewall 94 is higher than a top 100 of the opposing, second sidewall 96 such that molten solder 12, when in a certain volume in solder bath 92, is caused to exit the solder bath 92. The solder bath 92 may further include a pump (not shown) for forcing molten solder 12 through a solder nozzle 102 as illustrated with arrow 104. The molten solder 12 may be directed to flow over a solder wave guide 106 and cascade over the top 100 of the opposing, second sidewall 96. In this instance, the cascading molten solder 12 from solder wave guide 106 and the solder passing over the top 100 of second sidewall 96 may merge, the greater velocity of the cascading molten solder 12 accelerating the flow over the top 100 of second sidewall 96 through mass transfer. In another embodiment, the first sidewall 94 and the second sidewall 96 may be substantially the same height and, thus, at least one of the solder nozzle 102 and the solder wave guide 106 are configured to direct the molten solder 12 in a path that directs the molten solder 12 to an exterior of the solder bath 92. The vertical wave soldering apparatus 90 may further comprise a solder recapture device 122 for collecting the molten solder 12 as the molten solder 12 passes the semiconductor wafers 14 on the exterior of the solder bath 92 and a pump 124 for returning the molten solder 12 to solder bath 92. The solder recapture device 122 may be configured to remove any dross from the molten solder 12 and return the cleaned, molten solder 12 to the solder bath 92 so that only clean (substantially contaminant-free) molten solder 12 is cascaded into contact with semiconductor wafers 14.

The vertical wave soldering apparatus 90 may further include a substantially vertically oriented conveyor 110 having jigs 112 for holding semiconductor wafers 14 and configured to move the semiconductors wafer 14 in an upward direction. The conveyor 110 is positioned in relation to the solder bath 92 such that the conveyor 110 effectuates movement of the semiconductor wafers 14, wherein a first surface 113 of the upward moving semiconductor wafers 14 is contacted by the molten solder 12 as the molten solder 12 cascades downwardly over the second, opposing sidewall 96 to the exterior of the solder bath 92. The conveyor 110 or each jig 112 may further comprise a vibrator 38, such as an ultrasonic or megasonic vibrator, for vibrating or agitating a semiconductor wafer 14 as the semiconductor wafer 14 contacts the cascading molten solder 12. The vibration may help any air in openings 22 of the semiconductor wafers 14 escape during displacement by molten solder 12 such that the openings 22 may be more efficiently filled with the molten solder 12. It is also contemplated that conveyor 110 may be oriented to pass semiconductor wafers 14 horizontally across the downwardly cascading wave of molten solder 12, or even diagonally, which is to say both horizontally and upwardly, thereacross. In the embodiment of FIG. 9, conveyor 110 may be oriented so as to dispose semiconductor wafers 14 at a very slight, acute angle to the vertical, such as up to about 8°, with the mouths of openings 22 facing slightly upwardly.

The vertical wave soldering apparatus 90 may further include one or more of a preheating device 116 for preheating the semiconductor wafers 14 before the semiconductor wafers 14 contact the cascading molten solder 12, a fluxing device 118 for applying flux to the semiconductor wafers 14 before the semiconductor wafers 14 contact the cascading molten solder 12, an air knife 120 for removing any excess molten solder 12 from the semiconductor wafers 14 using a directed stream of hot gas, or a cleaning device (not shown) for cleaning the semiconductor wafers 14. The preheating device 116 may further help to remove air from openings 22 configured as blind vias as hot air in a blind via may rise and come out of the blind via more easily, thus, facilitating the removal of the hot air from the blind via as the blind via is filled with molten solder 12.

In another embodiment similar to that of FIG. 9 and depicted in FIG. 9A, the conveyor 110 of wave soldering apparatus 90' may be oriented at a relatively greater, acute angle to the vertical and in spaced relation to a sidewall 96' of the solder bath 92 when presenting a semiconductor wafer 14 to the cascading molten solder 12 (side wall 96', as shown, also optionally being angled to accommodate close passage of semiconductor wafers 14 thereby) such that a surface 113 of a semiconductor wafer 14 faces substantially upwardly and is contacted by the cascading molten solder 12 at an angle. The substantial angle may help facilitate the removal of any air from openings 22 of the semiconductor wafers 14 such that the openings 22 are more easily filled with the molten solder 12. In one embodiment, the conveyor 110 may be angled up to about, for example, 45° from the vertical when in proximity to wave soldering apparatus 90', conveyor 110 being a belt, chain or articulated segment type conveyor wherein a radical directional change may be effected as depicted in FIG. 9A to orient the path of wafers 14 from, for example, the horizontal to an upwardly facing direction in proximity to cascading molten solder 12 adjacent side wall 96'.

Although the vertical wave soldering apparatus 90 and 90' of FIGS. 9 and 9A, respectively, have been described herein as being used to place a semiconductor wafer 14 in contact with the molten solder 12, the vertical wave soldering apparatus 90 and 90' may further be configured to accommodate substrates formed from materials other than semiconductors. In one embodiment, the substrate may comprise a printed circuit board or interposer substrate or unsingulated array of boards or interposers, which may be fabricated from, by way of example only, a ceramic, BT resin, a polyimide, FR-4 or FR-5 laminate materials, or other suitable material as known in the art. The substrate may also comprise a flexible, high temperature tape or film, such as high temperature tapes or films, e.g., polyethylene terephthalate (Pet). Thus, the jigs 112 of the conveyor 110 may be configured to accommodate substrates of varying sizes. Further, the solder wave guide 106 and solder nozzle 102 may be configured to produce varying sizes and shapes of cascading molten solder 12 to accommodate the substrates of varying sizes. Placing the substrate or PCB in contact with the molten solder 12 may be used to effectuate filling of any openings or vias, or wetting any surfaces, such as terminal pads, of the substrate.

Figure 10A:
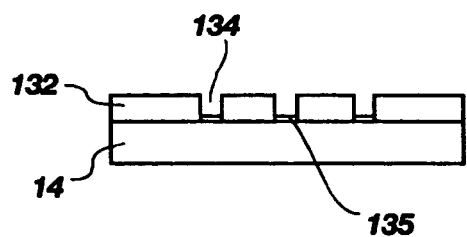
FIGS. 10A and 10B illustrate acts of one exemplary embodiment of forming bumps on a semiconductor wafer of the present invention.
Figure 10B:
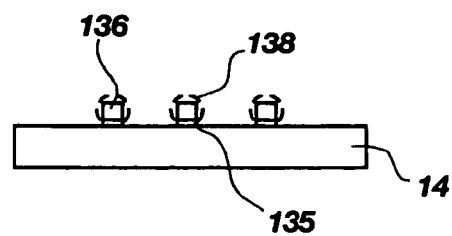

Referring to FIGS. 10A and 10B, illustrated are acts in a method of forming conductive bumps on a semiconductor wafer 14. For ease of description, the acts used to form the bumps will be described with reference to the semiconductor wafer 14, but it will be apparent to those of ordinary skill in the art that the method may be used to form conductive bumps on any substrate, including both rigid and flexible substrates. FIG. 10A is a cross-sectional view of a semiconductor wafer 14 having a mask layer 132 formed on at least a portion of a surface of the semiconductor wafer 14. In one embodiment, the mask layer 132 may comprise polyimide, and in other embodiments the mask layer 132 may comprise other suitable masking layers including, but not limited to, conventional photocurable materials, i.e., positive and negative photoresist materials. A pattern of openings 134 may exist in or be formed after application of the material of mask layer 132, exposing at least a portion of the surface of the semiconductor wafer 14, such as, for example, bond pads 135. The semiconductor wafer 14 having the mask layer 132 may be placed in contact with molten solder 12 to fill the openings 134 in mask layer 132 with the molten solder 12 using one of the following techniques: placing the semiconductor wafer 14 in contact with the solder wave 16 as described herein with references to FIGS. 1 and 2; immersing the semiconductor wafer 14 in the solder bath 10' as described herein with reference to FIGS. 3 and 4; immersing the semiconductor wafer 14 in the solder bath 10' along with other semiconductor wafers 14, such as in a batch process, as described herein with reference to FIG. 5; placing the semiconductor wafer 14 in contact with molten solder 12 with the drag solder apparatus 40 described herein with reference to FIG. 6; placing the semiconductor wafer 14 carried by the jig 66 of the conveyor 64 or 64' of the wave solder apparatus 60 or 60' and moving horizontally or at an acute angle to the horizontal in contact with molten solder 12 as described herein with reference to FIG. 7 or FIG. 8, respectively; or placing the semiconductor wafer 14 carried by the jig 112 of the conveyor 110 of the wave soldering apparatus 90, 90' and moving vertically or at an acute angle to the vertical in contact with the cascading molten solder 12 as described herein with reference to FIGS. 9 and 9A.

Once openings 134 are filled with the molten solder 12 and the molten solder 12 substantially solidifies, the mask layer 132, such as polyimide, may be removed or "stripped" using a suitable, known process for the type of mask layer 132 that is employed, as is conventional in the art. As illustrated in FIG. 10B, removal of the mask layer 132 results in bumps 136 being formed on the semiconductor wafer 14. The solder bumps 136 may be re-flowed to form solder balls 138 as shown in broken lines in FIG. 10B (the size of solder balls 138 being exaggerated for clarity), and subsequently be used to electrically connect the semiconductor wafer 14, other substrate, or semiconductor dice or other components (circuit boards, interposers, etc.) singulated therefrom to another electronic component.

The above-exemplified embodiments of the present invention describe methods and devices that place a semiconductor wafer or substrate in contact with solder. The exemplary embodiments may be integrated in an electronic component fabrication process that uses low-cost materials, simple methods and results in high quality components that are more inexpensive to fabricate than conventional fabrication techniques. Although the present invention has been depicted and described with respect to various exemplary embodiments, various additions, deletions and modifications are contemplated while remaining within the scope and exhibiting essential characteristics of the present invention. Further, various components or acts of an apparatus or method described with respect to one exemplary embodiment or drawing figure herein may be combined with other components or acts of another embodiment or drawing figure described herein. The scope of the invention is, thus, indicated by the appended claims rather than the foregoing description. All changes that fall within the meaning and range of equivalency of the claims are embraced within their scope.

What is claimed is:

1. A method of forming a solder bump on a substrate comprising:
    forming a mask layer having at least one opening on a surface of a substrate, wherein the at least one opening in the mask layer exposes a portion of a surface of the substrate;
    placing the substrate in a substantially vertical orientation, the substantially vertical orientation comprising an angle of up to 8° from the vertical;
    placing the substantially vertically oriented substrate in contact with a substantially downwardly cascading wave of molten solder to fill the at least one opening and contact substantially all of the exposed portion of the surface of the substrate;
    allowing the molten solder to substantially solidify within the at least one opening and over substantially all of the exposed portion of the surface of the substrate; and
    removing the mask layer.

2. The method according to claim 1, further comprising reflowing the substantially solid solder to a molten state.

3. The method according to claim 1, further comprising immersing the substantially vertical oriented substrate in molten solder.

4. The method according to claim 3, wherein immersing comprises moving the substantially vertically oriented substrate in at least one horizontal direction.

5. The method according to claim 4, wherein the at least one horizontal direction comprises two opposing horizontal directions.

6. The method according to claim 1, wherein placing the substantially vertically oriented substrate in contact with molten solder comprises placing a semiconductor wafer in contact with the molten solder.

7. The method according to claim 1, further comprising operatively coupling a vibrator to a member holding the substrate and vibrating the substantially vertically oriented substrate with the vibrator during at least a portion of the contact with the molten solder.

8. A method of placing a substrate in contact with molten solder, comprising:
    placing at least one substrate in a substantially vertical orientation adjacent a solder bath having molten solder therein, the substantially vertical orientation comprising an angle of up to 8° from the vertical;
    cascading at least some of the molten solder in a substantially downwardly moving wave adjacent an exterior surface of the solder bath; and
    placing the at least one substantially vertically oriented substrate in contact with the cascading molten solder.

9. The method according to claim 8, further comprising moving the at least one substantially vertically oriented substrate in a direction other than a direction of the cascading molten solder while in contact therewith.

10. The method according to claim 9, wherein the other direction comprises a substantially upward direction.

11. The method according to claim 10, wherein the substantially upward direction comprises an acute angle to the vertical.

12. The method according to claim 9, wherein the other direction comprises a substantially horizontal direction transversely across the cascading molten solder.

13. The method according to claim 9, wherein the other direction comprises a combined horizontal and vertical direction upwardly across the cascading molten solder.

14. The method according to claim 8, further comprising forming at least one opening in the at least one substrate prior to contacting the at least one substrate with the cascading molten solder and orienting a mouth of the at least one opening toward the cascading molten solder to substantially fill the at least one opening with solder.

15. The method according to claim 14, further comprising allowing solder in the at least one opening to substantially solidify, placing the at least one substrate in a substantially horizontal orientation, and heating the solder in the at least one opening to a molten state.

16. The method according to claim 8, wherein placing the at least one substantially vertically oriented substrate in contact with the cascading molten solder comprises placing at least one substantially vertically oriented semiconductor wafer in contact therewith.

17. The method according to claim 8, further comprising directing a stream of gas at the at least one substantially vertically oriented substrate with an air knife after contact with the cascading molten solder.

18. The method according to claim 8, further comprising operatively coupling a vibrator to a member holding the substrate and vibrating the at least one substantially vertically oriented substrate with the vibrator during at least a portion of the contact with the cascading molten solder.

* * * * *